United States Patent [19]

Jupa et al.

[11] 3,982,133
[45] Sept. 21, 1976

[54] COLLIMATOR CHANGER FOR SCINTILLATION CAMERA

[75] Inventors: Edward C. Jupa, Berwyn; Raymond L. Meeder, Palos Heights; Edward K. Richter, Buffalo Grove, all of Ill.

[73] Assignee: G. D. Searle & Co., Skokie, Ill.

[22] Filed: Jan. 16, 1974

[21] Appl. No.: 433,736

Related U.S. Application Data

[63] Continuation of Ser. No. 306,703, Nov. 15, 1972, abandoned.

[52] U.S. Cl. .............................. 250/505; 250/360
[51] Int. Cl.² ........................................ G21K 1/02
[58] Field of Search .......... 250/513, 505, 514, 336, 250/360

[56] References Cited
UNITED STATES PATENTS

| | | | |
|---|---|---|---|
| 2,667,588 | 1/1954 | Oswald | 250/105 |
| 2,959,680 | 11/1970 | Green | 250/105 |
| 2,998,526 | 8/1961 | Green et al. | 250/105 |
| 3,128,380 | 4/1964 | Muehllegner | 250/366 |
| 3,612,865 | 10/1971 | Walker | 250/366 |
| 3,631,249 | 12/1971 | Friede et al. | 250/86 |
| 3,684,886 | 8/1972 | Muehllegmer | 250/366 |

FOREIGN PATENTS OR APPLICATIONS 971,414    9/1964    United Kingdom.............. 250/505

Primary Examiner—Alfred E. Smith
Assistant Examiner—B. C. Anderson
Attorney, Agent, or Firm—Walter C. Ramm; Peter J. Sgarbossa; Albert Tockman

[57] ABSTRACT

A collimator changing assembly mounted on the support structure of a scintillation camera. A vertical support column positioned proximate the detector support column with a plurality of support arms mounted thereon in a rotatable cantilevered manner at separate vertical positions. Each support arm is adapted to carry one of the plurality of collimators which are interchangeably mountable on the underside of the detector and to transport the collimator between a store position remote from the detector and a change position underneath said detector.

5 Claims, 7 Drawing Figures

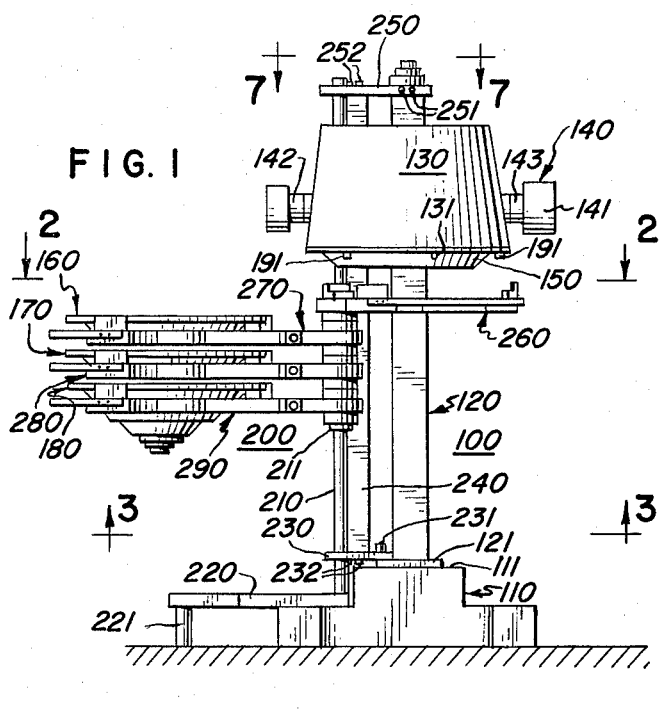
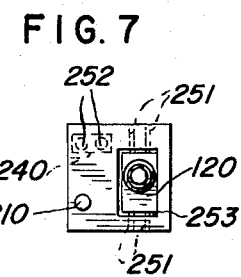
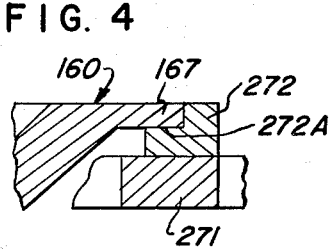
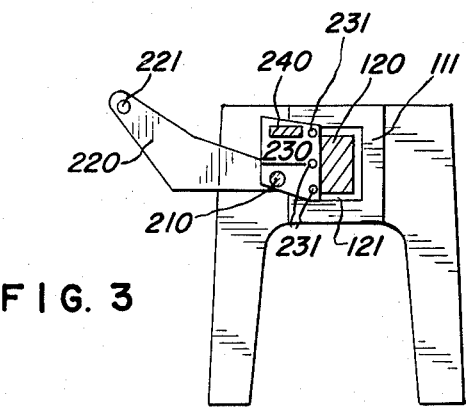
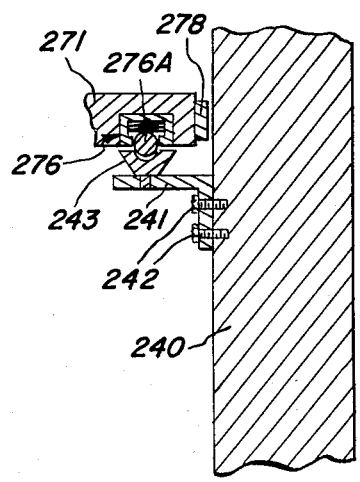

COLLIMATOR CHANGER FOR SCINTILLATION CAMERA

This is a continuation, of application Ser. No. 306,703, filed Nov. 15, 1972 now abandoned.

Scintillation cameras are in widespread use in a large number of medical facilities throughout the world. The overwhelming majority of scintillation cameras in use are of the Anger-type, (U.S. Pat. No. 3,011,057). Commercial versions of the Anger-type camera typically include, as part of the basic system, a plurality of collimators, each of which has a generally unique application. For example, a pinhole collimator is generally employed for magnification imaging a small organ such as the thyroid gland, whereas multi-channel collimators are used for larger organs such as the brain and liver. A camera system usually includes several multi-channel collimators each designed for different ranges of gamma ray energies. In addition, several types of multi-channel collimators exist, i.e. parallel, diverging (minifying), and converging (magnifying).

In prior art camera systems, these various collimators are stored on individual carts remote from the scintillation camera detector and a collimator changing operation necessitated the following procedure:

1. The patient cot is removed from underneath the detector head.
2. An empty collimator cart is rolled in from some remote place and positioned underneath the detector in a position to receive the mounted collimator.
3. The detector head is lowered until the collimator rests on the cart (the cart position may have to be altered several times for proper alignment) and the collimator is unbolted from the detector head.
4. The detector head is raised slightly and the collimator and cart are rolled away.
5. The storage cart with the desired collimator is rolled into position under the detector head.
6. The detector head is lowered onto the collimator (again the cart position may have to be altered several times to align the collimator with the detector head), and the collimator is bolted to the detector head.
7. The empty cart is rolled to its remote location.
8. The patient cot is replaced underneath the detector head. This procedure may take from five to ten minutes to complete.

In a medical institution which has a high utilization rate on its scintillation camera and which performs different diagnostic procedures requiring different collimators, the time involved in making a number of collimator changes during a working day seriously reduces the time available for actually examining patients with the equipment. In some cases, it would be preferable to perform several different types of diagnostic study on the same patient with collimators optimized for each study. The time consuming process of changing collimators has forced institutions to choose between using the same collimator for the different studies with some sacrifice in accuracy or changing collimators and thus studying fewer patients per day. Since brain studies constitute the largest volume of studies in a typical institution and it is generally preferable to perform both dynamic blood flow and static distribution studies on the same patient with a high efficiency collimator and a high resolution collimator, respectively, the dilemma of whether or not to change collimators is a troublesome one.

Therefore, it is the principal object of this invention to provide a collimator storing and changing apparatus which both significantly reduces the amount of time required for changing collimators and provides convenient out-of-the-way storage for a multiplicity of collimators.

A preferred embodiment of this invention, for use with a radiation imaging system which includes a detector supported in a vertically mobile manner on a detector support column and a plurality of collimators mountable in an interchangeable manner on the underside of the detector, comprises a collimator support column positioned proximate the detector support column and a plurality of support arms mounted at separate vertical positions on the collimator support column in a rotatable cantilevered manner with each support arm adapted to carry one of the collimators and to transport it between a store position remote from the detector and a change position underneath the detector. A stopping block mounted on each of the collimator support arms cooperates with the detector support column to define a reproducible change position for the collimator. An alignment pin is mounted on each support arm and cooperates with an alignment aperture on each collimator and an alignment pin on the underside of the detector to define an appropriate rotational alignment for the collimator. The combination of the reproducible change position and the rotational collimator alignment places the collimator in a position such that the detector head can be lowered onto the collimator and the mounting apertures on the collimator will be automatically aligned. A second stopping block mounted on each of the collimator support arms cooperates with a vertical support mounted proximate the collimator support column to define a reproducible store position for the support arms. In addition, a plurality of detent cups mounted on the vertical support cooperate with a plurality of detent pins on the support arms to maintain each support arm in a store position should a small jostling force strike the support arm.

Additional features and the advantages of the collimator storing and changing apparatus of this invention will be apparent from a consideration of the following detailed description in conjunction with the accompanying drawings, a brief description of which follows:

FIG. 1 is an elevational view of this invention.

FIG. 2 is a view of a portion of this invention taken along the lines 2—2 shown in FIG. 1;

FIG. 3 is a view of a portion of this invention taken along the lines 3—3 shown in FIG. 1;

FIG. 4 is a partial section view taken along the lines 4—4 in FIG. 2;

FIG. 5 is a partial section view taken along the lines 5—5 in FIG. 2;

FIG. 6 is a partial section view taken along the lines 6—6 in FIG. 2; and

FIG. 7 is a view of a portion of this invention taken along the lines 7—7 in FIG. 1.

FIG. 1 shows a preferred embodiment of this invention in association with a detector and stand of an Anger-type scintillation camera system sold by Nuclear-Chicago Corporation under the trademark "Pho/Gamma." Detector and stand 100 generally comprise a base 110, a detector support column 120, a detector 130, and a detector support yoke 140. Stand 100 is generally U-shaped and has a mounting platform 111 for support column 120 and its mounting plate 121. Detector 130 and its support yoke 140 are mounted on support column 120 in a vertically mobile manner with a drive motor (not shown) for powering them up and down. Support yoke 140 is a C-shaped yoke which is rotatably mounted on support column 120 and motor driven to rotate about a horizontal axis. Detector 130 is rotatably mounted on yoke 140 and driven by a motor in housing 141. Detector 130 is shown in its horizontal, face down position which it must be in to change collimators. A collimator 150 is shown mounted on detector 130 by means of bolts 191, two of the four being shown. A pair of alignment pins 131 (one shown) are mounted on an underside of detector 130 to ensure that a collimator is aligned properly for insertion of bolts 191. Each of collimators 160, 170, and 180 are interchangeably mountable on detector 130.

Collimator storing and changing apparatus 200 generally comprises a collimator support column 210, an outrigger stabilizing leg 220 with a foot 221, a vertical support member 240, a pair of mounting plates 230 and 250, and collimator support arms 260, 270, 280, and 290. Apparatus 200 is shown mounted on base 110 but it should be apparent that this is only for convenience and an arrangement for mounting it independent of base 110 could readily be implemented. As shown in FIG. 1, support arms 260, 270, 280, and 290 are mounted on support column 210 in a rotatable cantilevered manner and each carries a single one of the interchangeable collimators and transports it between a store position (e.g. position of collimator 160) and a change position (e.g. a collimator on support arm 260). The store and change positions are shown more clearly in FIG. 2. In the store position, collimators and associated support arms are out-of-the-way behind detector support column 120 so that a patient cot can readily be positioned under detector 130. A collar 211 mounted on column 210 holds the stack of support arms.

FIG. 2 shows various structural details of each support arm and a collimator carried thereon. Support arm 260 comprises a relatively thick steel member 261 on which collimator support blocks 262 are mounted. A circular aperture 269 receives a lower circular portion of a collimator if the collimator is relatively thick. A stopping block 264 is mounted on a side of member 261 in a position such that it stops the rotational movement at precisely the right point for mating a collimator to the detector. A second stopping block 268 is positioned to stop support arm 260 in its store position. Support blocks 262 support a collimator away from member 261 such that mounting bolts 191 (FIG. 1) are accessible. An alignment pin mechanism 263 is mounted on member 261 in a position such that, when it penetrates one of a plurality of regularly spaced apertures in a flange on a collimator resting on support blocks 262, the collimator is in rotational alignment in the change position for mounting on the detector head. A spring steel handle 265 is mounted on a side of member 261 to enable an operator to manipulate the support arm easily. Reference numeral 267 designates a bearing arrangement which permits rotation of member 261 around column 210.

FIG. 4 shows in detail the manner in which flange 167 on collimator 160 is supported on a shoulder 272A on support block 272 mounted on member 271. FIG. 5 shows in detail an alignment pin mechanism 273 which comprises a pin holder 301 with a pin 302 and a biasing spring 303 mounted therein. Flange 167 on collimator 160 will depress pin 302 until the collimator is rotated to align aperture 161 with pin 302, at which time pin 302 moves into aperture 161 and retains collimator 160 in a fixed position. As shown in FIG. 2, six regularly spaced apertures 161 to 166 are provided in flange 167 of collimator 160. When mounted to detector 130, apertures 161 and 162 will receive alignment pins mounted on the underside of the detector and apertures 163–166 will receive mounting bolts.

FIG. 6 shows in detail a detent arrangement for keeping support arm 270 in a store position. A detent cup 243 is mounted on an L-bracket 241 attached by fasteners 242 to vertical support 240. A spring loaded detent pin mechanism 276 mounted on the underside of member 270 retains member 270 in a store position until a sufficient force is applied to move detent pin 276A out of cup 243. Each support arm contains a similar detent arrangement.

As shown in FIG. 3, outrigger stabilizing leg 220 and foot 221 prevent tipping of the complete camera and changer assembly when loaded with collimators in a store position. Also, collimator changer mounting plate 230 is fastened to detector support mounting plate 121 with three bolts 231. FIG. 7 shows a second collimator changer mounting plate 250 with a rectangular aperture 253 which fits over detector support column 120 and is fastened thereto with set screws 251. A pair of bolts 252 fasten vertical support 240 to mounting plate 250.

By employing the apparatus of this invention, collimator changing is accomplished in less than half the time required when separate carts are employed. The changing procedure with this invention is as follows:

A. The empty support arm is rotated until its stopping block rests against the detector support column.

B. The detector head is lowered until the collimator rests on the support arm (no adjustment in support arm position is necessary because it is already aligned to receive the collimator) and the collimator is unbolted from the detector head.

C. The detector head is raised slightly and the support arm is rotated back to its store position.

D. The support arm with the desired collimator is rotated to the change position with the stopping block against the detector support column.

E. The detector is lowered onto the new collimator which is automatically aligned to receive alignment pins on the underside of the detector and the new collimator is bolted to the detector.

F. The detector is raised slightly and the empty support arm is returned to its store position.

A patient cot underneath the detector head need not be removed during a collimator changing cycle. Thus this invention provides a collimator storage and changing apparatus which is integrated with the detector and stand of a radiation camera system. A four arm version of the apparatus is shown by way of example, but two and three arm versions are also possible. In addition, for a system with a large number of collimators, a similar apparatus with two to four arms could be located on the other side of the detector support column. As mentioned above, the collimator storing and changing apparatus can be mounted on the base of the stand supporting the detector or it can be mounted independently on the floor. The former is more convenient because all of the support arms can be positioned over the detector in its lowest position and the outrigger leg moved to point to the rear of the base so that the combined apparatus can easily be moved through doors and hallways.

It should be apparent that numerous modifications could be made in the exemplary apparatus described above without departing from the scope of this invention as claimed in the following claims.

We claim:

1. In combination:
   a detector support means;
   a radiation detector mounted on said detector support means in a vertically mobile manner for selective positioning in one of a plurality of vertically separated collimator changing positions;
   a plurality of collimators suitable for radiation imaging and adapted for interchangeable mounting on said detector;
   means for securing a selected one of said collimators to said detector to the exclusion of all other of said collimators; and
   collimator changing and storage means comprising a single collimator support column positioned proximate to said detector support means, and a plurality of support arms mounted at vertically separated positions on said collimator support column in a laterally rotatable cantilevered manner, each of said support arms being adapted to carry a single one of said collimators and to transport it between a storage position remote from said detector and a collimator changing position.

2. Apparatus as claimed in claim 1 further comprising a stopping block mounted on each of said support arms for cooperative operation with said detector support means to define a reproducible position for a collimator carried thereon, which position is located directly beneath and adjacent to a single one of the aforesaid collimator changing positions of said detector.

3. Apparatus as claimed in claim 2 further comprising a vertical support mounted proximate said collimator support column, a second stopping block mounted on each of said collimator support arms cooperating with said vertical support to define a storage position for each collimator carried by said support arms, and a plurality of detent arrangements for immobilizing said support arms to maintain collimators carried thereon in storage positions comprising a plurality of detent pins on said support arms and a plurality of associated detent cups mounted on said vertical support.

4. Collimator storing and changing apparatus for a radiation imaging system which includes a detector supported in a vertically mobile manner on a detector support column and a plurality of collimators suitable for radiation imaging and mountable in an interchangeable manner on an underside of said detector comprising:
   a single collimator support column positioned proximate to said detector support column;
   a plurality of support arms mounted at vertically separated positions on said collimator support column in a laterally rotatable cantilevered manner and withdrawn to a retracted position remote from said detector during system operation, each of said support arms being adapted to carry a single of said collimators and to transport it between a storage position remote from said detector and a change position underneath said detector; and
   fastening members for attaching a single selected collimator to said detector.

5. Collimator storing and changing apparatus as claimed in claim 4 wherein each of said collimators includes a mounting flange having a plurality of apertures therein for receiving the aforesaid fastening members, and at least one alignment aperture therein for receiving an alignment pin mounted on said underside of said detector; and a collimator alignment pin is mounted on each of said support arms to define a position of appropriate rotational alignment for a collimator carried thereon.

* * * * *